United States Patent
Johnson et al.

(10) Patent No.: US 9,577,312 B2
(45) Date of Patent: Feb. 21, 2017

(54) POLARIZATION ALIGNMENT FOR WIRELESS NETWORKING SYSTEMS

(71) Applicant: FLIR Systems, Inc., Wilsonville, OR (US)

(72) Inventors: Mark Johnson, Vannes (FR); Chris Hodgson, Vannes (FR); Matthieu Maindrou, Segensworth (GB); Stuart Johnson, Segensworth (GB)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 14/810,350

(22) Filed: Jul. 27, 2015

(65) Prior Publication Data

US 2015/0333393 A1    Nov. 19, 2015

Related U.S. Application Data

(63) Continuation of application No. PCT/US2014/013439, filed on Jan. 28, 2014.

(60) Provisional application No. 61/759,147, filed on Jan. 31, 2013.

(51) Int. Cl.
| | |
|---|---|
| *H01Q 1/34* | (2006.01) |
| *H01Q 1/32* | (2006.01) |
| *H01Q 1/12* | (2006.01) |
| *H04B 7/04* | (2006.01) |
| *H04W 76/02* | (2009.01) |
| *H04W 84/18* | (2009.01) |

(52) U.S. Cl.
CPC ............. *H01Q 1/1257* (2013.01); *H01Q 1/34* (2013.01); *H04B 7/0426* (2013.01); *H04W 76/02* (2013.01); *H04W 84/18* (2013.01)

(58) Field of Classification Search
CPC .. H01Q 1/1242; H01Q 1/1257; H01Q 1/1264; H01Q 1/325; H01Q 1/34; H01Q 3/08; G01S 3/38; G01S 3/785
USPC ...................... 343/700 R, 708–714
See application file for complete search history.

(56) References Cited

U.S. PATENT DOCUMENTS

| | | | |
|---|---|---|---|
| 4,535,626 A | 8/1985 | Wakayama | |
| 8,207,902 B1* | 6/2012 | Tam ..................... | H01Q 1/1242 343/710 |
| 2004/0227655 A1 | 11/2004 | King | |
| 2009/0106990 A1* | 4/2009 | Harrill ................... | B60G 7/006 33/288 |
| 2011/0057838 A1* | 3/2011 | Melconian ................ | G01S 3/44 342/359 |
| 2011/0304453 A1* | 12/2011 | Lickfelt .............. | B60C 23/0418 340/447 |
| 2012/0089299 A1 | 4/2012 | Breed | |

(Continued)

*Primary Examiner* — Simon Nguyen
(74) *Attorney, Agent, or Firm* — Haynes and Boone, LLP

(57) ABSTRACT

Techniques are disclosed for systems and methods to provide polarization alignment for wireless networking systems. A polarization aligned wireless networking system may include one or more sensors, controllers, user interfaces, and/or other modules mounted to or in proximity to a vehicle. Antennas for each of the electronic devices may be implemented with linear polarization components that can be substantially aligned with a lateral axis of the vehicle. Each electronic device may be implemented with a logic device adapted to use a corresponding antenna to form one or more wireless links between the various electronic devices.

20 Claims, 4 Drawing Sheets

(56) References Cited

U.S. PATENT DOCUMENTS

| | | | |
|---|---|---|---|
| 2012/0215410 A1* | 8/2012 | McClure | A01B 79/005 701/50 |
| 2013/0097880 A1* | 4/2013 | Wernig | G01S 17/88 33/228 |
| 2013/0321225 A1* | 12/2013 | Pettus | H01Q 3/08 343/765 |

* cited by examiner

POLARIZATION ALIGNMENT FOR WIRELESS NETWORKING SYSTEMS

CROSS-REFERENCE TO RELATED APPLICATIONS

This patent application is a continuation of International Application No. PCT/US2014/013439 filed Jan. 28, 2014, which is incorporated herein by reference in its entirety.

International Application No. PCT/US2014/013439 claims priority to and the benefit of U.S. Provisional Patent Application No. 61/759,147 filed Jan. 31, 2013, which is incorporated herein by reference in its entirety.

TECHNICAL FIELD

One or more embodiments of the invention relate generally to wireless networking systems and more particularly, for example, to systems and methods for polarization alignment for wireless networking systems.

BACKGROUND

Wireless networking systems are typically used to facilitate communications between electronic devices where wired connections and networks are difficult to implement due to physical and/or power delivery constraints. Wireless networking systems are also useful where one or more networked devices and/or the wireless networking system itself are mobile. A significant and continuing problem for wireless networking systems is cross polarization of antennas used to form wireless links between electronic devices of the wireless networking system.

Various antenna designs and system methodologies have been developed to address degradation of wireless links due to cross polarization, but conventional methodologies include expensive antenna designs and/or antenna diversity systems, both of which typically increase overall costs of manufacturing, implementation, and testing. Furthermore, many complex antenna designs, and particularly antenna diversity methodologies, increase an overall power usage of a constituent electronic device. This can substantially decrease and/or eliminate the utility of the electronic device and/or the wireless networking system. Thus, there is a need for an improved methodology to address cross polarization for wireless networking systems.

SUMMARY

Techniques are disclosed for systems and methods to provide polarization alignment for wireless networking systems. In one embodiment, a polarization aligned wireless networking system may include one or more sensors, controllers, user interfaces, and/or other modules mounted to or in proximity to a vehicle. Antennas for each of the electronic devices may be implemented with linear polarization components that can be substantially aligned with a lateral axis of the vehicle. Each electronic device may be implemented with a logic device adapted to use a corresponding antenna to form one or more wireless links between the various electronic devices.

In another embodiment, a system includes a first electronic device mounted to a vehicle, where the first electronic device is coupled to a first antenna, and a second electronic device mounted to the vehicle, where the second electronic device is coupled to a second antenna, the second electronic device is adapted to communicate with the first electronic device over a wireless link via, at least in part, the first and second antennas, and linear polarization components of the first and second antennas are substantially aligned with a lateral axis of the vehicle.

In another embodiment, a method includes forming, using first and second antennas, a wireless link for communication between first and second electronic devices mounted to a vehicle, receiving a signal transmitted over the wireless link, displaying a power level of the received signal, and adjusting an alignment of the first or second antenna to increase the displayed power level and substantially align a linear polarization component of the first or second antenna to a lateral axis of the vehicle.

In a further embodiment, a method includes forming, using first and second antennas, a wireless link for communication between a sensor mounted to a vehicle and a user interface mounted to the vehicle, wherein linear polarization components of the first and second antennas are substantially aligned with a lateral axis of the vehicle, receiving a sensor signal transmitted over the wireless link, and displaying, by the user interface, sensor information corresponding to the received sensor signal.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, wireless networking systems and methods may advantageously include a plurality of antennas with linear polarization components that are aligned with a lateral axis of a vehicle. For example, the antennas may be used to form wireless links for communication between devices that are located at a typical user level, such as in a passenger compartment, or on deck of a ship, and devices located substantially above or below a typical user level, such as on the roof or undercarriage of an automobile, on a mast of a sailboat, or on a hull of a ship. By aligning linear polarization components of the antennas with a lateral axis of the vehicle, embodiments of the present disclosure may enable wireless communication between multiple devices on a vehicle with reduced fabrication and/or implementation costs and reduced power requirements.

Figure 1:
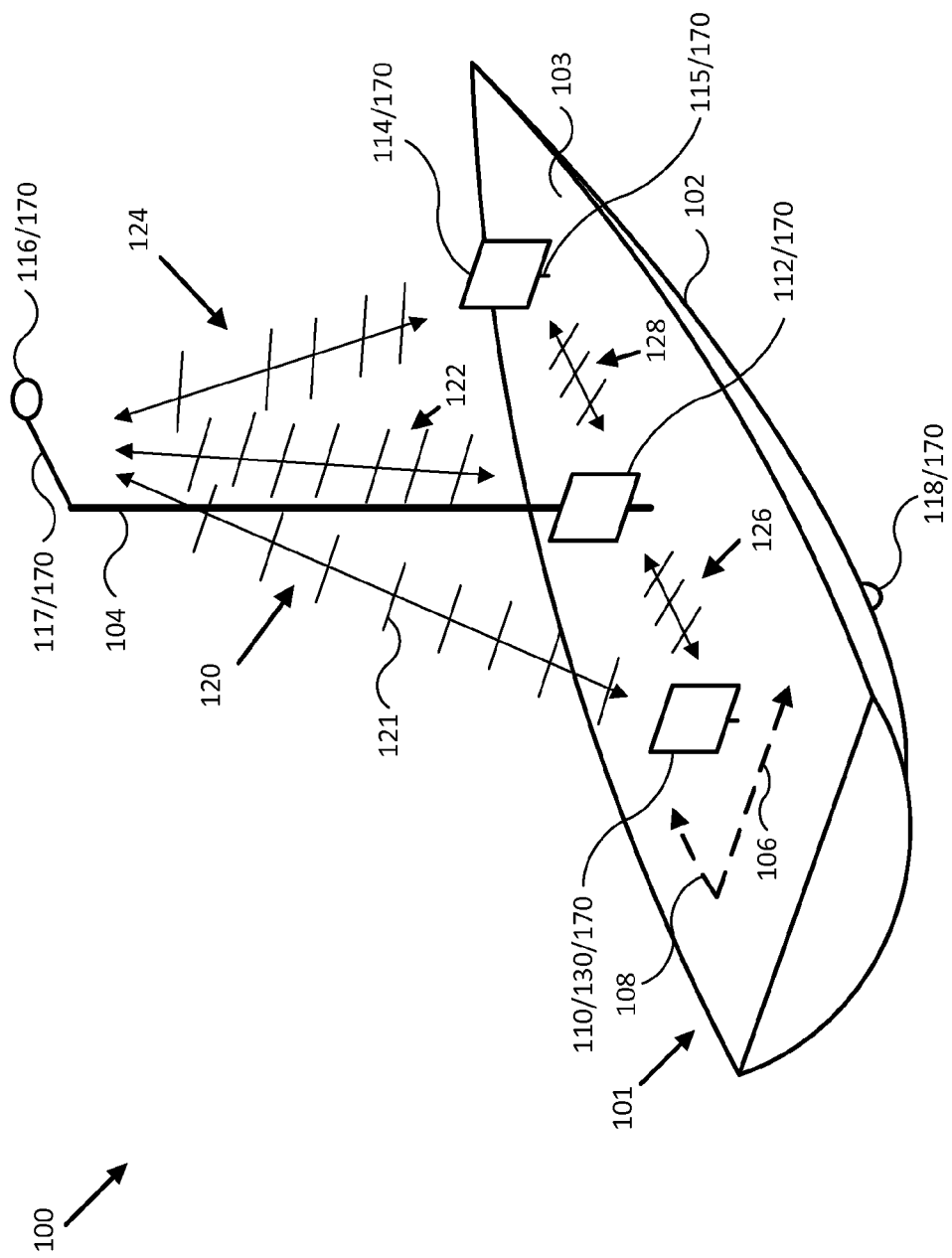
FIG. 1 illustrates a diagram of a wireless networking system in accordance with an embodiment of the disclosure.

FIG. 1 illustrates a diagram of a wireless networking system 100 in accordance with an embodiment of the disclosure. In the embodiment shown in FIG. 1, system 100 may be implemented to provide wireless communications for a particular type of vehicle 101, such as a sailboat, a ship, an automobile, and/or other types of vehicles.

In one embodiment, system 100 may include one or more user interfaces 110, 112, 114, a controller 130, one or more sensors, such as wind sensor 116 and/or water speed sensor 118, and one or more antennas 170 electrically coupled to and/or integrated with a corresponding one of the various devices. Antennas 170 may be adapted to provide wireless links, such as wireless links 120, 122, 124, 126, 128, for example, for communication between the various devices in system 100.

In the embodiment illustrated by FIG. 1, vehicle 101 includes a hull 102, a deck 103, and a mast 104. In other embodiments, hull 102, deck 103, and mast 104 may correspond to attributes of a passenger automobile or other type of vehicle, for example, such as an undercarriage, a passenger compartment, an engine compartment, a trunk, a roof, a cockpit, and/or other portions of a vehicle located predominately at, above, or below a typical user level of the vehicle. For instance, a typical user level of vehicle 101 may include deck 103. In such embodiments, hull 102 may be predominately below the typical user level, and mast 104 may be predominately above the typical user level. Direction 106 illustrates a direction substantially parallel to and/or aligned with a lateral axis of vehicle 101 (e.g., "across" vehicle 101), and direction 108 illustrates a direction substantially parallel to and/or aligned with a longitudinal axis of vehicle 101 (e.g., "along" vehicle 101), as described herein.

Wireless links 120-128 are each illustrated by a double arrow line indicating a link between devices located approximately at each arrow tip and by cross lines (e.g., cross line 121) indicating a linear polarization component of the wireless link. For example, wireless links 120-128 may be implemented as radio waves generated, transmitted, and/or received by one or more of antennas 170. In the embodiment shown in FIG. 1, the radio waves include electric fields with orientations (e.g., polarizations of the radio waves) corresponding to the illustrated polarizations of the wireless links (e.g., polarizations aligned with a lateral axis of vehicle 101), which, in turn, may correspond to the physical structure, position, and/or orientation of one or more of antennas 170, as described herein. Therefore, in some embodiments, adjusting an alignment of an antenna (e.g., one of antennas 170) may adjust a linear polarization component of a radio wave generated, transmitted, and/or received by the antenna, and therein adjust a linear polarization component of the antenna itself (e.g., where a linear polarization component of an antenna corresponds to a linear polarization component of radio waves generated, transmitted, and/or received by the antenna). In various embodiments, an alignment of an antenna may be adjusted by adjusting a physical position and/or orientation of an antenna, for example, or by varying one or more gains and/or phases applied to signals provided to the antenna, as described herein.

As can be seen from FIG. 1, wireless links 120-128 each include a linear polarization component substantially aligned with direction 106 (e.g. a lateral axis of vehicle 101). In various embodiments, wireless links 120-128 may be formed by corresponding antennas 170 of each of user interfaces 110-114, controller 130, wind sensor 116, and/or corresponding mounts 115 and/or 117. Although not explicitly shown in FIG. 1, one or more wireless links may also be formed between water speed sensor 118 and any of the other devices of system 100 using one or more of antennas 170.

Antennas 170 may be individually implemented as any appropriate antenna or antenna system that can be adapted to generate, transmit, and/or receive radio waves including a linear polarization component that can be substantially aligned with direction 106 and/or a lateral axis of vehicle 101. For example, each of antennas 170 may be implemented as one or more of a wire antenna, a microstrip antenna, an aperture antenna, a whip antenna, a patch antenna, a dipole antenna, a loop antenna, a printed circuit board (PCB) antenna, and/or other type of antenna or antenna system that includes a linear polarization component that can be adjusted to substantially align with a particular direction, such as direction 106. In one embodiment, each of the various antennas 170 of system 100 may be implemented as the same type of antenna for each device. Alternatively, antennas 170 may be implemented according to a variety of different antenna types, for example, each adapted to a specific orientation, location, power capacity, or other physical or electrical design constraints related to a particular device of system 100 and/or a particular type of vehicle 101.

In particular, a type of antenna may be selected based on a maximum allowed power consumption for a particular range of reliable transmission/reception and/or an implementation cost. For example, PCB antennas including a linear polarization component may be implemented relatively inexpensively and, in some embodiments, can be integrated with a PCB for a sensor, user interface, or other device of system 100, and such integration can further reduce implementation (e.g., manufacturing, testing, packaging) costs. In various embodiments, a PCB antenna may be implemented as conductive patterns, traces, vias, and/or other structures formed in or among metalized layers of a PCB, and can exhibit characteristics of a variety of types of antennas. In such embodiments, a PCB antenna may be implemented with a linear polarization component that may be fixed relative to the PCB in which it is implemented, for example, or that may be variable according to one or more gains and/or phases applied to signals supplied to the PCB antenna (e.g., by beamforming components), as described herein.

By reducing or substantially eliminating transmission and/or reception losses due to cross polarization (e.g., where linear polarization components of antennas are not aligned to a common direction), embodiments of the present disclosure significantly reduce a power level needed to form reliable wireless links 120-128, particularly when using one or more PCB antennas, for example. In embodiments where vehicle 101 is a vehicle with a mast, such as a sailboat, for example, typical distances between wind sensor 116 and user interface 112 may be 25 meters, and wind sensor 116 may not receive power from a power source for vehicle 101. In similar embodiments, where physical access to a device is limited, reducing overall power usage for communications substantially increases the utility of the device while increasing overall convenience. Other constraints, such as regulatory constraints, may also limit output power of one or more antennas of a wireless networking system, such as to outputs less than 10 mW, for example, and increasing a reliable range (e.g., by eliminating losses due to cross polarization) can substantially broaden a legal compliance of a wireless networking system.

In some embodiments, a linear polarization component of one of antennas 170 may be adjusted by adjusting a position and/or orientation of a corresponding device and/or mount housing the antenna. In other embodiments, a linear polarization component of one of antennas 170 may be adjusted by applying a specific gain and/or phase to signals supplied to the antenna (e.g., by beamforming components) to produce one or more of wireless links 120-128. In a further embodiment, one or more of antennas 170 may be implemented as a circularly or elliptically polarized antenna including two orthogonal linear polarization components, where one or the other of the linear polarization components may be substantially aligned with direction 106.

Each of user interfaces 110-114, controller 130, wind sensor 116, and water speed sensor 118 may be implemented with any appropriate logic device (e.g., processing device, microcontroller, processor, application specific integrated circuit (ASIC), field programmable gate array (FPGA), memory storage device, memory reader, or other device or combinations of devices). The logic device, for example, may be adapted to execute, store, and/or receive appropriate instructions, such as software instructions implementing a method for forming a wireless link with one or more other devices, and/or for transmitting and/or receiving communications, such as sensor signals and/or sensor information, over such wireless links. In one embodiment, a method may include instructions to form a wireless link according to a particular wireless networking protocol, for example. In another embodiment, such method may include instructions to perform relay and/or translation node functionality, as described herein.

In addition, a machine readable medium may be provided for storing non-transitory instructions for loading into and execution by a logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of user interfaces 110-114, controller 130, wind sensor 116, and water speed sensor 118 may be implemented with one or more amplifiers, modulators, phase adjusters, beamforming components, digital to analog converters (DACs), analog to digital converters (ADCs), various interfaces, and/or other analog and/or digital components enabling each of the devices of system 100 to interface with, provide signals for transmission over, and receive signals from a corresponding antenna, for example, in order to facilitate communications over wireless links formed between one or more devices of system 100, as would be understood by one skilled in the art. Such components may be integrated with a corresponding device of system 100, for example, or may be integrated partially with the corresponding device and partially with a corresponding antenna (e.g., one of antennas 170).

In some embodiments, one or more of antennas 170 may be integrated with a corresponding device of system 100. In such embodiments, the antenna may be integrated into a housing of the device, for example, or may be integrated into an electrical component of the device, such as a printed circuit board (PCB) of the device. For example, antenna 170 of user interface 112 may be implemented as a patch microstrip antenna integrated with a PCB of user interface 112, for instance, or may be implemented as a wire antenna integrated with a housing for user interface 112 and electrically coupled to a PCB or antenna interface of user interface 112.

In other embodiments, one or more of antennas 170 may be integrated with a mount (e.g., mounts 115 and/or 117) used to physically couple a corresponding device (e.g., user interface 114 and/or wind sensor 116) to vehicle 101. For example, antenna 170 of wind sensor 116 may be implemented as a wire antenna integrated with mount 117 for wind sensor 116 and electrically coupled to an antenna interface of wind sensor 116. In further embodiments, antenna 170 of wind sensor 116 may be integrated with both mount 117 and wind sensor 116. In still further embodiments, one or more of antennas 170 may be implemented with a mount used to physically couple the antenna to its corresponding device and/or vehicle 101.

Antennas 170 and wireless links 120-128 may be implemented according to a variety of wireless networking protocols and/or frequency bands, for example, such as various WiFi, Bluetooth, Zigbee, Xbee, Micronet, or other medium and/or short range wireless networking protocols and/or implementations. In one embodiment, antennas 170 and wireless links 120-128 may be implemented according to a single wireless networking protocol, and each device of system 100 may be able to communicate directly with each other device of system 100 over one or more wireless links 120-128.

In another embodiment, antennas 170 and wireless links 120-128 may be implemented according to a plurality of wireless networking protocols. In such embodiment, devices utilizing different wireless networking protocols may be adapted to communicate with each other through one or more translation nodes (e.g., devices of system 100 implemented with antennas and components supporting more than one wireless networking protocol) that are adapted to translate communications between protocols.

In a further embodiment, devices of system 100 utilizing the same wireless networking protocol may be adapted to communicate with each other through one or more relay nodes (e.g., other devices of system 100 within transmission range of each other) that are adapted to relay communications (e.g., in a daisy-chain manner) to neighboring devices.

Each of user interfaces 110-114 may be implemented as a display, a touch screen, a keyboard, a mouse, a joystick, a knob, a steering wheel, a ship's wheel, a yolk, and/or any other device capable of accepting user input and/or providing feedback to a user. In various embodiments, each of user interfaces 110-114 may be adapted to provide user input (e.g., as a type of signal and/or sensor information) to other devices of system 100, such as controller 130.

In one embodiment, each of user interfaces 110-114 may be adapted to receive a signal transmitted over one or more of wireless links 120-128 (e.g., formed, at least in part, by one or more of antennas 170 and/or corresponding logic devices of user interfaces 110-114 and/or other devices of system 100), and display a power level of the received signal. For example, an ADC of wind sensor 116 may be adapted to measure a power level of a signal transmitted from user interface 110 to wind sensor 116. Wind sensor 116 may be configured to transmit the power level measurement to user device 110, which may then display the power level of the signal received by wind sensor 116 to a user. In other embodiments, user interface 110 may be adapted to measure a power level of, for example, the signal received by user interface 110, and to display that power level in addition to, or as an alternative to, the power level of the signal received by wind sensor 116. More generally, any power level measurement corresponding to a wireless link formed between devices of system 100 may be transmitted, received, and/or displayed by one or more of user interfaces 110-114.

In further embodiments, adjustments may be made to corresponding antennas 170 to increase the displayed power level and/or substantially align linear polarization components of the first and second antennas to a lateral axis of vehicle 101. A power level of a received signal should increase as inter-device and/or overall alignment is increased. For example, devices of system 100 may be implemented with servos to adjust a mounting, position, and/or orientation of the devices, the antennas, or both, in order to adjust the alignment of the antennas. Adjustment servos may be controlled by user input supplied to one or more of user interfaces 110-114, for example, or may be controlled according to instructions executed by one or more devices of system 100, such as controller 130. In alternative embodiments, adjustments to antennas 170 may be made directly by a user manipulating one of the devices and/or mounts of system 100. In various embodiments, displaying a power level of a received signal may include producing an audible sound indicating (e.g., thorough variable volume, variable frequency, or other variable audible attribute) an increasing and/or decreasing power level.

In another embodiment, each of user interfaces 110-114 may be adapted to receive a sensor signal, (e.g., from wind sensor 116 and/or water speed sensor 118, over wireless links formed, at least in part, by one or more of antennas 170 and/or corresponding logic devices of user interfaces 110-114 and/or sensors 116-118), for example, and display sensor information corresponding to the received sensor signal to a user.

In related embodiments, user interfaces 110-114 may be adapted to process the sensor signal to determine the sensor information. For example, a sensor signal may include raw wind speed sensor data in units of meters/second and specifying a direction relative to a heading of vehicle 101. In such embodiment, one or more of user interfaces 110-114 may be adapted to process the raw wind speed sensor data to determine sensor information indicating the wind speed in knots and/or a cardinal direction of the wind. For example, in some embodiments, one or more of user interfaces 110-114 may be adapted to receive a sensor signal including a heading of vehicle 101 (e.g., from an orientation sensor 240 in FIG. 2, discussed further herein) and use the heading to determine the cardinal direction of the wind. Such sensor information may then be displayed, for example, and may be transmitted to other user interfaces, sensors, or controllers of system 100, for instance, for display and/or further processing.

Each of user interfaces 110-114 may be adapted to accept a user input, for example, to initiate a wireless link formation process, to display a particular wireless link power level, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, and/or to otherwise facilitate operation of system 100 and operation of devices within system 100. For instance, one or more of user interfaces 110-114 may accept user input designating whether one or more devices of system 110 may perform as a relay and/or translation node. Once one of user interfaces 110-114 accepts a user input, the user input may be transmitted to other devices of system 100 over one or more of wireless links 120-128.

As shown in FIG. 1, in one embodiment, user interface 114 may be mounted to vehicle 101 using mount 115 so as to be in proximity to vehicle 101. Although not explicitly shown, user interface 112 may also be mounted to mast 104 substantially near a mastfoot of mast 104, and user interface 110 may be mounted substantially near a cockpit of vehicle 101. Such mounts may be fixed, for example, or may include gimbals and other leveling mechanisms so that a display of the user interfaces stays substantially level with a horizon. In embodiments where, for example, mount 115 includes leveling mechanisms, antenna 170 of user interface 114 may be mounted and/or otherwise located within a portion of mount 115 so as to stay substantially aligned with a lateral axis of vehicle 101.

In another embodiment, one or more of user interfaces 110-114 may be located in proximity to vehicle 101 and be mobile throughout a user level (e.g. deck 103) of vehicle 101. For example, user interface 110 may be implemented with a lanyard and/or other type of strap and/or attachment device and be physically coupled to a user of vehicle 101 so as to be in proximity to vehicle 101. In such embodiments, a user of vehicle 101 may adjust a position and/or orientation of an attached user interface to substantially align an antenna (e.g., one of antennas 170) of the user-attached user interface to a lateral axis of vehicle 101, for example, and in some embodiments, form wireless links with other devices of system 100.

In various embodiments, one or more of user interfaces 110-114 may be implemented with a relatively thin display that is integrated into a PCB of the corresponding user interface in order to reduce size, weight, housing complexity, and/or manufacturing costs. In such embodiments, one or more of antennas 170 may be implemented as a PCB antenna integrated with the same display PCB, for example, such that the linear polarization of the PCB antenna and the lateral axis of vehicle 101 dictates the orientation of the display (e.g., substantially facing the stern and/or bow of vehicle 101). In embodiments where system complexity is discouraged, one or more of user interfaces 110-114 may be implemented with PCB antennas and display PCBs facing the stern of vehicle 101, with linear polarization components of the PCB antennas substantially aligned with a later axis of vehicle 101 (e.g., across vehicle 101), and wind sensor 116 may similarly be implemented with a PCB antenna similarly aligned so as to substantially eliminate cross polarization and reduce wind drag, as described herein.

Wind sensor 116 may be implemented as one or more of an anemometer, a wind vane, a hot wire, an unbalanced rotor, an electronic pitot tube and/or other device capable of measuring a wind speed and/or a direction of wind substantially near vehicle 101, for example, and capable of providing such measurements as sensor signals communicated over one or more wireless links 120-128. As shown in FIG. 1, in some embodiments, wind sensor 116 may be mounted to a portion of vehicle 101 substantially above a typical user level, such as to a masthead of mast 104. Wind sensor 116 may include one or more batteries and/or other electrical power storage devices, for example, and may include one or more solar cells and/or wind-powered turbines to generate electrical power. In some embodiments, wind sensor 116 may be powered by a power source for vehicle 101 (e.g., an engine, a battery), for example, using one or more power leads to divert power to wind sensor 116.

As noted herein, wind sensor 116 may be implemented with an antenna 170 (e.g., a PCB antenna), a logic device, and/or other analog and/or digital components enabling wind sensor 116 to interface with, provide signals for transmission over, and receive signals from the antenna in order to communicate with one or more devices of system 100. Also shown in FIG. 1 is mount 117 for wind sensor 116. In some embodiments, antenna 170 may be integrated with wind sensor 116, mount 117, or with both, and the combination may be adapted to provide a thin profile to reduce and/or avoid wind drag. In various embodiments, wind sensor 116, mount 117, and/or a separate mount for antenna 170 of wind sensor 116 may be adjusted in order to substantially align a linear polarization of antenna 170 of wind sensor 116 to a lateral axis of vehicle 101. In other embodiments, wind sensor 116 may include servos to adjust a position and/or orientation of antenna 170 of wind sensor 116. In further embodiments, a linear polarization of antenna 170 of wind sensor 116 may be adjusted through use of beamforming and/or other analog and/or digital components. In still further embodiments, wind sensor 116 may be adapted to operate as a relay and/or translation node.

Water speed sensor 118 may be implemented as an electronic pitot tube and/or other device capable of measuring a linear water speed of water near vehicle 101 and providing such measurements as sensor signals communicated over one or more wireless links (e.g., wireless links 120-128). As shown in FIG. 1, in some embodiments, water speed sensor 118 may be mounted to a portion of vehicle 101 substantially below a typical user level, such as to hull 102. Water speed sensor 118 may include one or more batteries and/or other electrical power storage devices, for example, and may include one or more water-powered turbines to generate electrical power. In some embodiments, water speed sensor 118 may be powered by a power source for vehicle 101, for example, using one or more power leads penetrating hull 102.

As noted herein, water speed sensor 118 may be implemented with an antenna 170 (e.g., a PCB antenna), a logic device, and/or other analog and/or digital components enabling water speed sensor 118 to interface with, provide signals for transmission over, and receive signals from the antenna in order to communicate with one or more devices of system 100. In some embodiments, antenna 170 may be integrated with water speed sensor 118 and the combination may be adapted to provide a thin profile to reduce and/or avoid water drag. In various embodiments, water speed sensor 118 and/or a separate mount for antenna 170 of water speed sensor 118 may be adjusted in order to substantially align a linear polarization of antenna 170 of water speed sensor 118 to a lateral axis of vehicle 101. In other embodiments, a linear polarization of antenna 170 of water speed sensor 118 may be adjusted through use of beamforming and/or other analog and/or digital components. In still further embodiments, water speed sensor 118 may be adapted to operate as a relay and/or translation node.

Controller 130 may be implemented as any appropriate logic device (e.g., processing device, microcontroller, processor, application specific integrated circuit (ASIC), field programmable gate array (FPGA), memory storage device, memory reader, or other device or combinations of devices). Controller 130 may be adapted to execute, store, and/or receive appropriate instructions, such as software instructions implementing a control loop for controlling various operations of vehicle 101, for example. Such software instructions may also implement methods for forming wireless links 120-128, processing sensor signals, determining sensor information, providing user feedback (e.g., through user interfaces 110-114), querying devices for operational parameters, designating devices as relay and/or translation nodes, selecting operational parameters for wireless networking protocols, and/or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with an antenna. For example, controller 130 may be adapted to store sensor signals, sensor information, power levels for wireless links, or other operational parameters over time, for example, and provide such stored data to a user using user interfaces 110-114. In some embodiments, controller 130 may be integrated with one or more user interfaces (e.g., user interface 110), and, in one embodiment, may share an antenna. As noted herein, controller 130 may be adapted to execute one or more control loops for steering control (e.g., through steering actuator 250 of FIG. 2), collision avoidance, and/or other various operations of vehicle 101. In some embodiments, a control loop may include processing sensor signals and/or sensor information in order to control one or more operations of vehicle 101.

Figure 2:
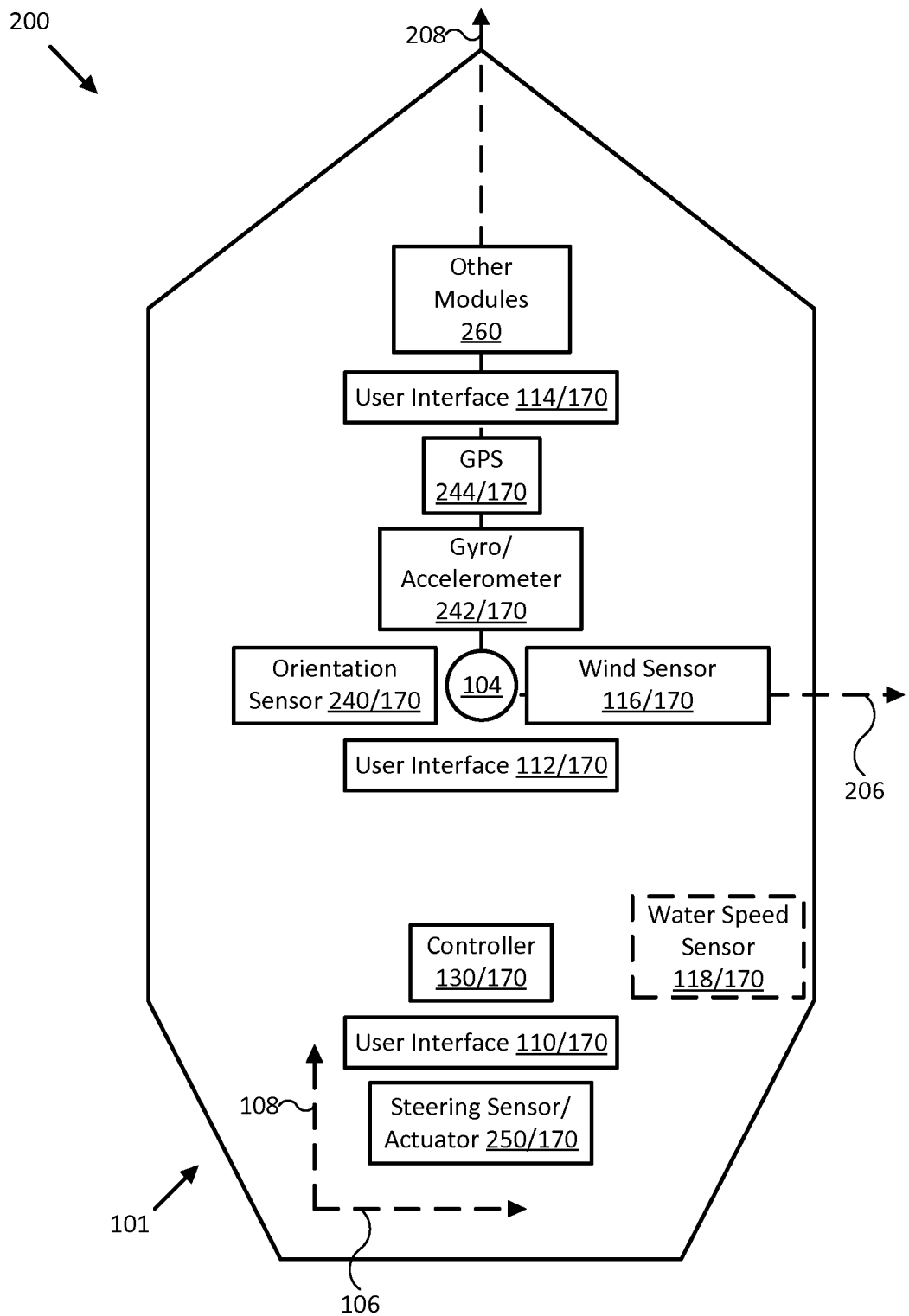
FIG. 2 illustrates a block diagram of a wireless networking system in accordance with an embodiment of the disclosure.

FIG. 2 illustrates a diagram of a wireless networking system 200 in accordance with an embodiment of the disclosure. In the embodiment shown in FIG. 2, system 200 may be implemented to provide wireless communications for vehicle 101, similar to system 100 of FIG. 1. For example, system 200 may include user interfaces 110-114, controller 130, various sensors and actuators, and one or more antennas 170 electrically coupled to and/or integrated with a corresponding one of the various devices. Antennas 170 may be adapted to provide wireless links for communication between the various devices in system 200.

In the embodiment illustrated by FIG. 2, vehicle 101 includes lateral axis 206 and longitudinal axis 208 meeting at mast 104 (e.g., near a center of gravity of vehicle 101). As can be seen from FIG. 2, direction 106 is substantially parallel to and/or aligned with lateral axis 206 of vehicle 101 (e.g., "across" vehicle 101), and direction 108 is substantially parallel to and/or aligned with longitudinal axis 208 of vehicle 101 (e.g., "along" vehicle 101), as described herein. Each one of antennas 170 may be implemented with a linear polarization component that can be substantially aligned with lateral axis 206 of vehicle 101.

Although the various devices of system 200 are shown without perspective in FIG. 2, each device may be located at, above, or below a typical user level, for example, and may be located at positions different from those depicted in FIG. 2. For example, in one embodiment, wind sensor 116 may be located substantially above a user level of vehicle 101, such as at a masthead of mast 104, and in other embodiments, at a different position along mast 104 and/or another portion of vehicle 101. In some embodiments, water speed sensor 118, drawn with a dashed line to indicate a position below a user level of vehicle 101, may be located nearer to longitudinal axis 108.

Each of user interfaces 110-114, controller 130, wind sensor 116, water speed sensor 118, orientation sensor 240, gyroscope and/or accelerometer 242, GPS 244, steering sensor/actuator 250, and one or more other modules 260 may be implemented with any appropriate logic device that may be adapted to execute, store, and/or receive appropriate instructions, such as software instructions implementing one or more of the methods and/or operations described herein. For example, such methods may include instructions to form a wireless link according to a particular wireless networking protocol.

In addition, each of the devices of system 200 may be implemented with various integrated and/or removable machine readable mediums, various interfaces, and various analog and/or digital components enabling each of the devices of system 200 to interface with, provide signals for transmission over, and receive signals from a corresponding antenna, for example, in order to facilitate communications over wireless links formed between one or more devices of system 200. Such components may be integrated with a corresponding device (and/or its mount) of system 200, for example, or may be integrated partially with the corresponding device and partially with a corresponding antenna (e.g., one of antennas 170). Antennas 170 and corresponding wireless links of system 200 (not explicitly shown in FIG. 2) may be implemented according to a variety of wireless networking protocols and/or frequency bands, for example, such as various WiFi, Bluetooth, Zigbee, Xbee, Micronet, or other medium and/or short range wireless networking protocols and/or implementations.

Orientation sensor 240 may be implemented as an electronic compass, sextant, or other device capable of measuring a heading and other orientation states of vehicle 101 and providing such measurements as sensor signals to other devices of system 200 (e.g., user interfaces 110-114, controller 130) over a wireless link.

Gyroscope and/or accelerometer 242 may be implemented as one or more gyroscopes, accelerometers, and/or other devices capable of measuring rotational and/or linear accelerations of vehicle 101 and providing such measurements as sensor signals other devices of system 200 (e.g., user interfaces 110-114, controller 130) over a wireless link.

GPS 244 may be implemented as a global positioning satellite receiver and/or other device capable of determining absolute and/or relative position of vehicle 101 based on wireless signals received from space-born and/or terrestrial sources, for example, and capable of providing such measurements as sensor signals other devices of system 200 (e.g., user interfaces 110-114, controller 130) over a wireless link. In some embodiments, GPS 244 may be adapted to determine a speed of vehicle 101 (e.g., using a series of position measurements) along a heading of vehicle 101 and/or along different directions relative to a heading of vehicle 101.

Steering sensor/actuator 250 may be adapted to sense and/or physically adjust a steering mechanism for vehicle 101 according to one or more control signals (e.g., a steering demand) provided by controller 130. Steering sensor/actuator 250 may be physically coupled to a rudder of vehicle 101, for example, and be adapted to physically adjust the rudder to a variety of positive and/or negative steering angles.

Other modules 260 may include other and/or additional sensors, actuators, communications modules/nodes, and/or user interface devices used to provide additional environmental information of vehicle 101, for example. In some embodiments, other modules 260 may include a humidity sensor, a temperature sensor, a barometer, a radar system, a visible spectrum camera, an infrared camera, and/or other environmental sensors providing measurements and/or other sensor signals that can be displayed to a user and/or used by other devices of system 200 (e.g., controller 130) to provide operational control of vehicle 101 that compensates for environmental conditions, such as water density, for example, or an object in a path of vehicle 101.

In various embodiments, one or more of orientation sensor 240, gyroscope/accelerometer 242, GPS 244, steering sensor/actuator 250, and/or other modules 260, may be mounted to a portion of vehicle 101 substantially above, below, or at a typical user level. Each device may include one or more batteries or other electrical power storage devices, for example, and may include one or more solar cells or other electrical power generating devices. In some embodiments, one or more of the devices may be powered by a power source for vehicle 101.

As noted herein, each of the devices may be implemented with an antenna 170 (e.g., a PCB antenna), a logic device, and/or other analog and/or digital components enabling each device to interface with, provide signals for transmission over, and receive signals from an antenna in order to communicate with other devices of system 200. In some embodiments, an antenna (e.g. one of antennas 170) may be integrated with its corresponding device and/or a mount for the device. In various embodiments, each device, its mount, and/or a separate mount for the corresponding antenna may be adjusted in order to substantially align a linear polarization of the antenna to a lateral axis of vehicle 101. In other embodiments, one or more of the devices of system 200 may include servos to adjust a position and/or orientation of the antenna and/or integrated device. In further embodiments, a linear polarization of the antenna may be adjusted through use of beamforming and/or other analog and/or digital components. In still further embodiments, one or more of the devices of system 200 may be adapted to operate as a relay and/or translation node.

Figure 3:
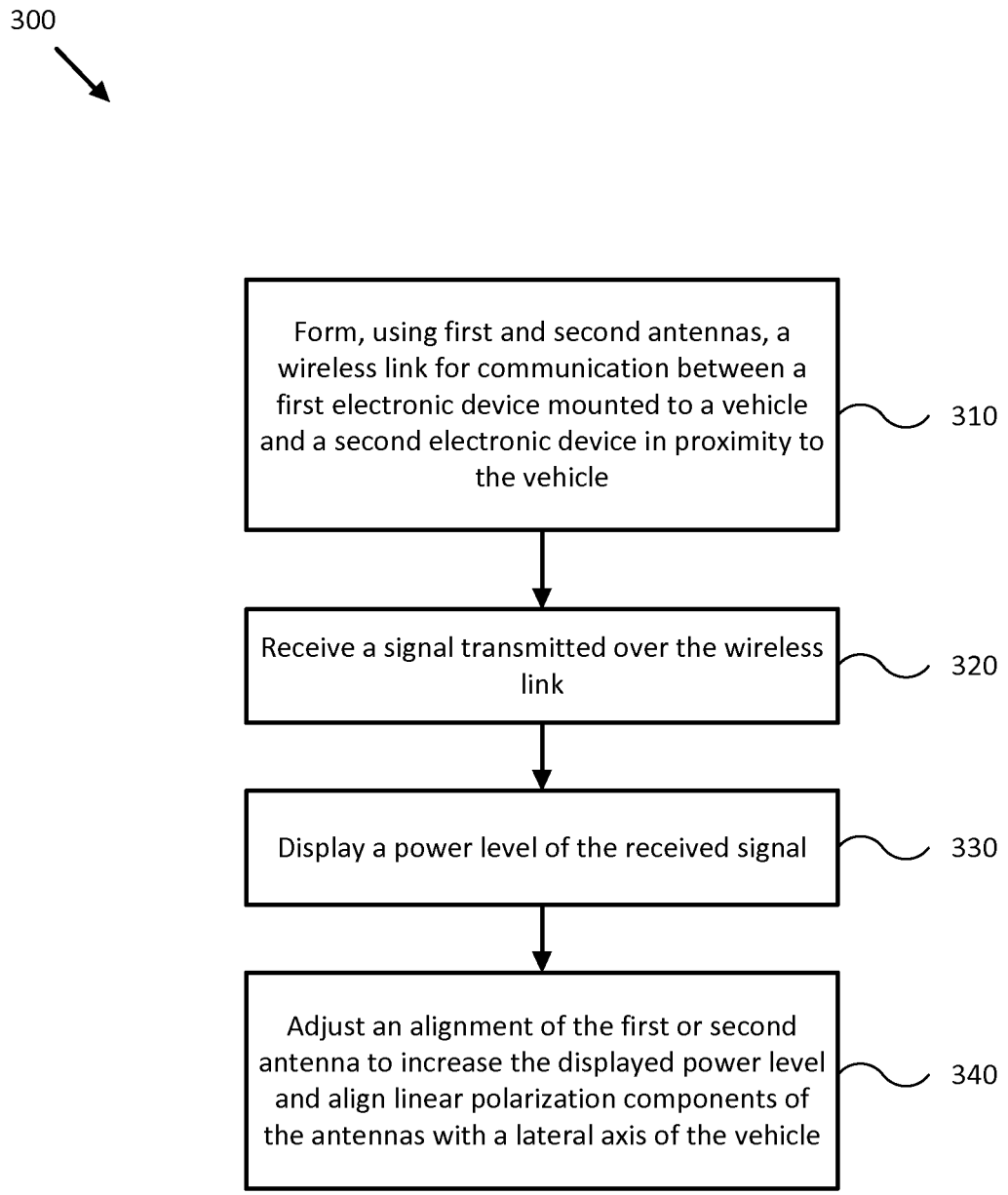
FIG. 3 illustrates a flow diagram of various operations to provide polarization alignment for wireless networking systems in accordance with an embodiment of the disclosure.

FIG. 3 illustrates a flow diagram of process 300 to provide polarization alignment for a wireless networking system of vehicle 101 in accordance with an embodiment of the disclosure. In some embodiments, the operations of FIG. 3 may be performed by a logic device of any electronic device of a wireless networking system (e.g., devices of system 100 of FIG. 1 and/or system 200 of FIG. 2). It should be appreciated that any step, sub-step, sub-process, or block of process 300 may be performed in an order or arrangement different from the embodiment illustrated by FIG. 3. For example, in other embodiments, blocks 320-240 may be repeated until an acceptable power level is displayed. Although process 300 is described with reference to systems 100 and 200, process 300 may be performed by other systems different from systems 100 and 200 and including a different selection of electronic devices, vehicles, and/or vehicle attributes.

In block 310, user interface 110 forms, using a first antenna 170 of wind sensor 116 and a second antenna 170 of user interface 110, wireless link 120 for communication between wind sensor 116 and user interface 110. For example, user interface 110 mounted to and/or in proximity to vehicle 101 may be adapted to send and receive signals to wind sensor 116 mounted to vehicle 101, to establish wireless link 120 according to a particular wireless networking protocol and/or implementation. Parameters (e.g., frequencies, protocols, passwords, encryption keys) for one or more wireless networking protocols and/or implementations may be provided on an integrated and/or removable memory device, for example, as user input (e.g., communicated over a previously established wireless link), and/or as control signals transmitted over a previously established wireless link with one of the devices of systems 110 and/or 200.

In various embodiments, any device of system 100 and/or system 200 may be adapted to form a wireless link with another device. Furthermore, a device may form multiple wireless links to multiple devices in a similar fashion. For example, wind sensor 116 and/or user interface 110 may be adapted to form, using at least antenna 170 of user interface 112, wireless link 122 and/or 126 for communication between user interface 112 and wind sensor 116 and/or user interface 110. In one embodiment, only wireless links 120 and 122 may be formed, wind sensor 116 and user interface 112 may be in communication over wireless link 122, and user interfaces 110 and 112 may be in communication over wireless link 120 and 122, where wind sensor 116 acts as a relay node. In another embodiment, wireless links 120, 122, and 126 may be formed, and user interfaces 110 and 112 may be in communication directly over wireless link 26.

In block 320, user interface 110 receives a signal transmitted over wireless link 120. For example, user interface 110 may be adapted to receive a sensor signal transmitted over wireless link 120 by wind sensor 116. A signal transmitted over a wireless link may include a sensor signal, a control signal (e.g., for controlling operation of a device of system 100 and/or 200), a signal representing text, power levels, and/or sensor information, a signal representing various parameters for a networking system and/or operational parameters for vehicle 101, or other signals including various information communicated between devices of systems 100 and/or 200. In various embodiments, any device of system 100 and/or 200 may be adapted to receive a signal transmitted over a wireless link. In embodiments where an additional wireless link is formed to an additional electronic device (e.g., user interface 112), an additional signal, similar or different to the original signal, may be received over at least the additional wireless link.

In block 330, user interface 110 displays a power level of a received signal. For example, user interface 110 may be adapted to display a power level of a signal received by user interface 110 from wind sensor 116 over wireless link 120. In other embodiments, user interface 110 may be adapted to receive a signal including a power level of a signal received by wind sensor 116 and display the power level of the signal received by wind sensor 116. In various embodiments, any device implemented with a display may be adapted to display a power level of any signal received by any device of system 100 and/or 200.

A power level of a received signal may be measured by one or more analog and/or digital components of a particular device of system 100 and/or 200, such as an ADC of a sensor, user interface, controller, actuator, or other module of system 100 and/or 200. Display of a power level may include displaying a numerical value as text, incrementally lighting a series of LEDs, varying a brightness and/or frequency of an indicator, providing an audible sound indicating a variable power level, or providing another type of indication of the power level to a user. In embodiments where an additional wireless link is formed to an additional electronic device (e.g., user interface 112), one or more user interfaces may be adapted to display an additional power level corresponding to another signal received over the additional wireless link.

In block 340, user interface 110 adjusts an alignment of antenna 170 of wind sensor 116 or antenna 170 of user interface 110 to increase a displayed power level and substantially align linear polarization components of the antennas with lateral axis 206 of vehicle 101. For example, user interface 110 may be adapted to provide control signals (e.g., transmitted over wireless link 120) to servos of wind sensor 116 and/or user interface 110 to adjust a position and/or orientation of either or both antennas. In other embodiments, user interface 110 may be adapted to display a predicted adjustment direction and/or magnitude (e.g., based on user input and/or additional sensor signals corresponding to position and/or orientation of vehicle 101 and/or either or both antennas) to a user to facilitate a user making physical adjustment to either or both antennas. For example, such predicted adjustment parameters may be used to direct a user to position and orient a mobile user interface to align a linear polarization component of the antenna of the mobile user interface with a lateral axis of the vehicle.

As noted herein, in some embodiments, a linear polarization component (e.g., an alignment) of an antenna of a device may be adjusted by adjusting a position and/or orientation of the antenna, a mount of the antenna, the device (e.g., where the antenna is at least partially integrated into the device), and/or a mount of the device. In other embodiments, a linear polarization component of an antenna for a device may be adjusted by adjusting one or more gains and/or phases applied to signals provided to the antenna, as described herein. In various embodiments, any device may be adapted to adjust an alignment of an antenna using the various methods described herein. In embodiments where an additional wireless link is formed to an additional electronic device (e.g., user interface 112), one or more user interfaces may be adapted to provide additional control signals, display predicted adjustment parameters, and/or provide additional gain and/or phase parameters for aligning linear polarization components of antennas to a later axis of vehicle 101.

Figure 4:
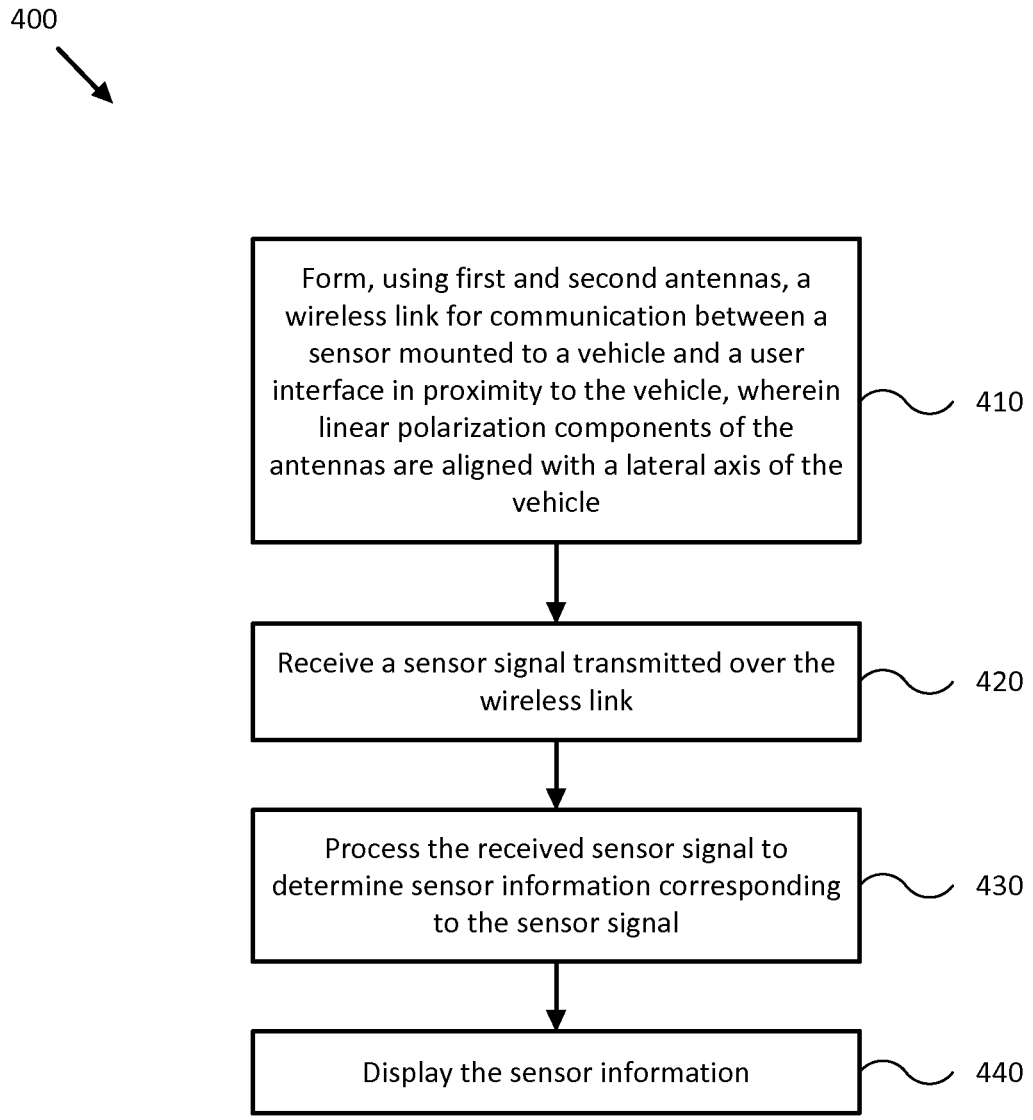
FIG. 4 illustrates a flow diagram of various operations to utilize polarization alignment for wireless networking systems in accordance with an embodiment of the disclosure.

FIG. 4 illustrates a flow diagram of process 400 to utilize polarization alignment for a wireless networking system of vehicle 101 in accordance with an embodiment of the disclosure. In some embodiments, the operations of FIG. 4 may be performed by a logic device of an electronic device of a wireless networking system (e.g., devices of system 100 of FIG. 1 and/or system 200 of FIG. 2). It should be appreciated that any step, sub-step, sub-process, or block of process 400 may be performed in an order or arrangement different from the embodiment illustrated by FIG. 4. For example, in other embodiments, blocks 420-440 may be repeated to display a variety of sensor information. Although process 400 is described with reference to systems 100 and 200, process 400 may be performed by other systems different from systems 100 and 200 and including a different selection of electronic devices, vehicles, and/or vehicle attributes.

In block 410, user interface 110 forms, using a first antenna 170 of wind sensor 116 and a second antenna 170 of user interface 110, wireless link 120 for communication between wind sensor 116 and user interface 110. For example, user interface 110 mounted to and/or in proximity to vehicle 101 may be adapted to send and receive signals to wind sensor 116 mounted to vehicle 101, to establish wireless link 120 according to a particular wireless networking protocol and/or implementation. Parameters (e.g., frequencies, protocols, passwords, encryption keys) for one or more wireless networking protocols and/or implementations may be provided on an integrated and/or removable memory device, for example, as user input (e.g., communicated over a previously established wireless link), and/or as control signals transmitted over a previously established wireless link with one of the devices of systems 110 and/or 200.

In various embodiments, any device of system 100 and/or system 200 may be adapted to form a wireless link with another device. Furthermore, a device may form multiple wireless links to multiple devices in a similar fashion. For example, wind sensor 116 and/or user interface 110 may be adapted to form, using at least antenna 170 of orientation sensor 240, one or more wireless links for communication between user interface 112 and wind sensor 116 and/or orientation sensor 240. In one embodiment, only one additional wireless link may be formed, wind sensor 116 and orientation sensor 240 may be in communication over the additional wireless link, and user interfaces 110 and orientation sensor 240 may be in communication over wireless link 120 and the additional wireless link, where wind sensor 116 acts as a relay node. In another embodiment, two or more additional wireless links may be formed, and user interface 110 and orientation sensor 240 may be in communication directly over one of the additional wireless links.

In block 420, user interface 110 receives a sensor signal transmitted over wireless link 120. For example, user interface 110 may be adapted to receive a sensor signal transmitted over wireless link 120 by wind sensor 116. A sensor signal transmitted over a wireless link may include a raw and/or processed measurement of a relative and/or absolute wind speed and direction, a water speed, a vehicle orientation, a vehicle position, a vehicle acceleration, a measurement of a particular environmental condition near vehicle 101, and/or other types of sensor signals. In various embodiments, any device of system 100 and/or 200 may be adapted to receive a sensor signal transmitted over a wireless link. For example, controller 130 may be adapted to receive a sensor signal from orientation sensor 240 to determine a steering control signal. In other embodiments, wind sensor 116 may be adapted to receive a sensor signal from orientation sensor 240 and/or GPS 244 to determine an absolute wind direction, for example. In embodiments where an additional wireless link is formed to an additional electronic device (e.g., user interface 112), an additional signal, similar or different to the original signal, may be received over at least the additional wireless link.

In block 430, user interface 110 processes a received sensor signal to generate sensor information corresponding to the sensor signal. For example, user interface 110 may be adapted to process a sensor signal received over wireless link 120 from wind sensor 116, which may include a relative wind speed and/or direction, for instance, to determine an absolute wind speed and/or direction derived from the relative wind speed and/or direction. In various embodiments, any device of system 100 and/or 200 may be adapted to process a sensor signal to generate sensor information. For example, wind sensor 116 may be adapted to receive a sensor signal from orientation sensor 240 and/or GPS 244 and process the sensor signal to determine an absolute wind direction, which may then be transmitted to a user interface, for example, for display to a user.

In block 440, user interface 110 displays sensor information. For example, user interface 110 may be adapted to display sensor information corresponding to a sensor signal received by user interface 110 from wind sensor 116 over wireless link 120. In other embodiments, user interface 110 may be adapted to display sensor information corresponding to a sensor signal received and/or processed by a different device of systems 100 and/or 200, where the sensor information is transmitted to user interface 110 prior to being displayed. In various embodiments, any device implemented with a display may be adapted to display sensor information corresponding to any sensor signal received by any device of system 100 and/or 200.

Display of sensor information may include displaying a numerical value as text, incrementally lighting a series of LEDs, varying a brightness and/or frequency of an indicator, providing an audible sound indicating a variable sensor information, or providing another type of indication of the sensor information to a user. In embodiments where an additional wireless link is formed to an additional electronic device (e.g., water speed sensor 118), one or more user interfaces may be adapted to display sensor information corresponding to another sensor signal received over the additional wireless link.

Because processes 300 and/or 400 provide and/or utilize a polarization aligned wireless networking system, embodiments of processes 300 and/or 400 may be implemented to provide a reliable yet low power medium to short range wireless networking system for a vehicle, particularly when an embodiment utilizes one or more PCB antennas, as described herein. As noted herein, where physical access to a sensor, controller, user interface, or other modules is restricted and/or limited, due to positioning of the device relative to a vehicle, for example, reducing overall power usage for communications substantially increases the long-term utility of the device as well as the wireless networking system while increasing overall convenience.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a first electronic device mounted to a vehicle, wherein the first electronic device is coupled to a first antenna; and
a second electronic device mounted to the vehicle, wherein the second electronic device is coupled to a second antenna, wherein the second electronic device is adapted to communicate with the first electronic device over a wireless link via, at least in part, the first and second antennas, and wherein linear polarization components of the first and second antennas are substantially aligned with a lateral axis of the vehicle.

2. The system of claim 1, wherein:
the first electronic device comprises a wind sensor, a water speed sensor, an orientation sensor, a GPS, a gyroscope, an accelerometer, a temperature sensor, a barometer, or a steering sensor; and
the second electronic device comprises a user interface.

3. The system of claim 1, wherein:
the first electronic device is mounted substantially above or below a user level of the vehicle; and
the second electronic device is located substantially at the user level of the vehicle.

4. The system of claim 1, wherein:
the first antenna is fixed relative to the vehicle substantially near a masthead of the vehicle; and
the second antenna is fixed relative to the vehicle and substantially near a user level of the vehicle.

5. The system of claim 1, further comprising:
a third electronic device in proximity to the vehicle, wherein the third electronic device is adapted to communicate with the first or second device over at least another wireless link via, at least in part, a third antenna electrically coupled to the third electronic device, and wherein a linear polarization component of the third antenna is substantially aligned with a lateral axis of the vehicle.

6. The system of claim 5, wherein:
the third electronic device is physically coupled to a user of the vehicle.

7. The system of claim 5, wherein:
the first and third devices are adapted to communicate over the at least another wireless link; and
the second and third devices are adapted to communicate over the wireless link and the at least another wireless link.

8. The system of claim 5, wherein:
the at least another wireless link comprises two wireless links;
the first and third devices are adapted to communicate over at least a first one of the two wireless links; and
the second and third devices are adapted to communicate over at least a second one of the two wireless links.

9. The system of claim 5, wherein:
the first antenna is fixed relative to the vehicle substantially near a masthead of the vehicle;
the second antenna is fixed relative to the vehicle substantially near a mastfoot of the vehicle;
the third antenna is fixed relative to the vehicle substantially near a cockpit of the vehicle.

10. A method comprising:
forming, using first and second antennas, a wireless link for communication between first and second electronic devices mounted to a vehicle;
receiving a signal transmitted over the wireless link;
displaying a power level of the received signal; and
adjusting an alignment of the first or second antenna to increase the displayed power level and substantially align a linear polarization component of the first or second antenna to a lateral axis of the vehicle.

11. The method of claim 10, wherein:
the adjusting the alignment of the first antenna comprises adjusting a mounting of the first electronic device to the vehicle; and
the adjusting the alignment of the second antenna comprises adjusting a mounting of the second antenna to the vehicle.

12. The method of claim 10, further comprising:
forming, using at least a third antenna, at least another wireless link for communication between a third electronic device and the first or second device, wherein the third electronic device is in proximity to the vehicle;
receiving at least another signal transmitted over the at least another wireless link;
displaying at least another power level of the received at least another signal; and
adjusting an alignment of the third antenna to increase at least one of the displayed power levels and substantially align a linear polarization component of the third antenna to a lateral axis of the vehicle.

13. The method of claim 12, wherein:
the adjusting the alignment of the third antenna comprises adjusting a position or orientation of the third electronic device.

14. The method of claim 12, wherein:
the first and third devices are in communication over the at least another wireless link; and
the second and third devices are in communication over the wireless link and the at least another wireless link.

15. The method of claim 12, wherein:
the forming the at least another wireless link comprises forming two wireless links;
the first and third devices are in communication over at least a first one of the two wireless links; and
the second and third devices are in communication over at least a second one of the two wireless links.

16. A method comprising:
forming, using first and second antennas, a wireless link for communication between a sensor mounted to a vehicle and a user interface mounted to the vehicle, wherein linear polarization components of the first and second antennas are substantially aligned with a lateral axis of the vehicle;
receiving a sensor signal transmitted over the wireless link; and
displaying, by the user interface, sensor information corresponding to the received sensor signal.

17. The method of claim 16, wherein:
the sensor comprises a wind sensor, a water speed sensor, an orientation sensor, a GPS, a gyroscope, an accelerometer, a temperature sensor, a barometer, or a steering sensor.

18. The method of claim 16, further comprising:
forming, using at least a third antenna, at least another wireless link for communication between another sensor mounted to the vehicle and the sensor or the user interface, wherein a linear polarization component of the third antenna is substantially aligned with a lateral axis of the vehicle;
receiving at least another sensor signal transmitted over the at least another wireless link; and
displaying, by the user interface, sensor information corresponding to the received at least another sensor signal.

19. The method of claim 18, wherein:
the first and third devices are in communication over the at least another wireless link; and
the second and third devices are in communication over the wireless link and the at least another wireless link.

20. The method of claim 18, wherein:
the forming the at least another wireless link comprises forming two wireless links;
the sensor and the another sensor are in communication over at least a first one of the two wireless links; and
the user interface and the another sensor are in communication over at least a second one of the two wireless links.

* * * * *